(12) United States Patent
Chu et al.

(10) Patent No.: US 9,696,828 B2
(45) Date of Patent: Jul. 4, 2017

(54) TOUCH MODULE

(71) Applicants: Yu-Han Chu, Hsin-Chu (TW); Li-Chun Tai, Hsin-Chu (TW); Yi-Lung Wang, Hsin-Chu (TW); Chia-Chia Lin, Hsin-Chu (TW)

(72) Inventors: Yu-Han Chu, Hsin-Chu (TW); Li-Chun Tai, Hsin-Chu (TW); Yi-Lung Wang, Hsin-Chu (TW); Chia-Chia Lin, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 88 days.

(21) Appl. No.: 14/306,237

(22) Filed: Jun. 17, 2014

(65) Prior Publication Data

US 2015/0002758 A1    Jan. 1, 2015

(30) Foreign Application Priority Data

Jun. 26, 2013   (TW) .............................. 102122758 A

(51) Int. Cl.
*G06F 3/041*    (2006.01)
(52) U.S. Cl.
CPC .................... *G06F 3/041* (2013.01)
(58) Field of Classification Search
CPC ........ G06F 3/041; G06F 3/0412; G06F 3/044; G06F 2203/04107
See application file for complete search history.

(56) References Cited

U.S. PATENT DOCUMENTS

2010/0141608 A1*   6/2010   Huang .................... G06F 3/044
                                                                    345/178
2011/0227859 A1    9/2011   Hsu
(Continued)

FOREIGN PATENT DOCUMENTS

CN          201788340          4/2011
CN          102681712          9/2012
(Continued)

OTHER PUBLICATIONS

"Office Action of Taiwan Counterpart Application", issued on Dec. 29, 2014, p. 1-p. 3.
(Continued)

*Primary Examiner* — Ibrahim Khan
(74) *Attorney, Agent, or Firm* — Jianq Chyun IP Office

(57) ABSTRACT

A touch module having a sensing area and a non-sensing area is provided. The touch module includes a cover covering the sensing and non-sensing areas, a first and a second sensing electrode layers disposed in the sensing area, a first and a second circuit layers disposed in the non-sensing area, a shielding layer, and a blocking layer. The first and second circuit layers are electrically connected to the first and second sensing electrode layers respectively. The first and second circuit layers at least partially overlap each other along a direction perpendicular to a surface of the cover. The shielding layer is disposed in the non-sensing area and between the first and second circuit layers. The blocking layer is disposed on aforementioned surface and in the non-sensing area. The blocking layer at least partially overlaps the first circuit layer, the second circuit layer, and the shielding layer along aforementioned direction.

15 Claims, 14 Drawing Sheets

(56) References Cited

U.S. PATENT DOCUMENTS

| | | | |
|---|---|---|---|
| 2013/0016065 A1* | 1/2013 | Reynolds | G06F 3/0412 345/174 |
| 2014/0184956 A1* | 7/2014 | Satou | G06F 3/044 349/12 |

FOREIGN PATENT DOCUMENTS

| | | |
|---|---|---|
| CN | 102707823 | 10/2012 |
| CN | 202472596 | 10/2012 |
| CN | 202677362 | 1/2013 |
| TW | M388686 | 9/2010 |
| TW | 201120506 | 6/2011 |
| TW | M437991 | 9/2012 |
| TW | M454579 | 6/2013 |

OTHER PUBLICATIONS

"Office Action of China Counterpart Application", issued on Sep. 23, 2016, p. 1-p. 7.

* cited by examiner

TOUCH MODULE

CROSS-REFERENCE TO RELATED APPLICATION

This application claims the priority benefit of Taiwan application serial no. 102122758, filed on Jun. 26, 2013. The entirety of the above-mentioned patent application is hereby incorporated by reference herein and made a part of this specification.

BACKGROUND OF THE INVENTION

1. Field of the Invention

The present invention generally relates to an electronic module, and more particularly, to a touch module.

2. Description of Related Art

Conventional push-button human machine interfaces cannot meet users' requirement any more with the development of multi-functional electronic devices. Accordingly, touch devices have been quickly developed. Compared to a conventional push-button operation interface, a touch device can be operated more conveniently and intuitionally. Through a touch device, a user can directly click at objects, menus, or icons displayed on a screen image by using a finger or stylus or operate these objects, menus, or icons with different gestures.

In more detail, a touch module includes an upper sensing electrode layer and a lower sensing electrode layer for respectively sensing touch inputs performed by the user along different directions. Besides, a touch module further includes an upper circuit layer and a lower circuit layer for respectively transmitting the sensing signals of the upper sensing electrode layer and the lower sensing electrode layer. Generally, the upper sensing electrode layer and the lower sensing electrode layer are disposed in a sensing area of the touch module, and the upper circuit layer and the lower circuit layer are disposed in a non-sensing area of the touch module. The non-sensing area surrounds the sensing area and is located at the border of a touch device. The upper circuit layer and the lower circuit layer in the non-sensing area are hidden by a blocking layer (for example, an ink layer) at the border of the touch device, so that the touch device could have an appealing appearance. Serious electrical interference will be caused if the upper circuit layer and the lower circuit layer overlap each other. Thus, in an existing touch device, the upper circuit layer and the lower circuit layer are usually not overlapped. However, such a design causes the total width of the upper circuit layer and the lower circuit layer to increase. As a result, the width of the non-sensing area and the blocking layer couldn't be reduced, which is against today's trend of narrow border design of touch devices.

A touch sensor is disclosed in China Patent Publication No. CN102707823A, in which a shielding sheet is disposed between conductive wires and the position where a user will directly contact, and the shielding sheet shields the conductive wires to prevent any unexpected capacitance variation between each conductive wire and the position touched by the user. A touch device is disclosed in China Patent Publication No. CN102681712A, in which a sensing layer is disposed at the periphery of the touch device for shielding any interference caused by a user's finger on the signal transmission lines in the peripheral area. A touch device is disclosed in China Patent No. CN202472596U, in which a shielding layer is disposed corresponding to peripheral connection lines, and an insulation pattern is formed between the shielding layer and the peripheral connection lines. A capacitive touch panel is disclosed in U.S. Patent No. US20110227859A1, in which an electromagnetic shielding layer is disposed on the bottom surface of a substrate.

SUMMARY OF THE INVENTION

Accordingly, the invention is directed to a touch module that is advantageous to the narrow border design of a touch device.

Other objects and advantages of the invention may be further illustrated by the technical features broadly embodied and described as follows. In order to achieve one of or part or all of the above purposes or other purposes, an embodiment of the invention provides a touch module having a sensing area and a non-sensing area. The non-sensing area surrounds the sensing area. The touch module includes a cover, a first sensing electrode layer, a second sensing electrode layer, a first circuit layer, a second circuit layer, a shielding layer, and a blocking layer. The cover covers the sensing area and the non-sensing area and has a surface. The first sensing electrode layer and the second sensing electrode layer are disposed in the sensing area. The first circuit layer and the second circuit layer are disposed in the non-sensing area and are electrically connected to the first sensing electrode layer and the second sensing electrode layer respectively. The first circuit layer and the second circuit layer at least partially overlap each other along a direction perpendicular to the surface of the cover. The shielding layer is disposed in the non-sensing area and located between the first circuit layer and the second circuit layer. The blocking layer is disposed on the surface of the cover and located in the non-sensing area. The blocking layer at least partially overlaps the first circuit layer, the second circuit layer, and the shielding layer along the direction perpendicular to the surface of the cover.

According to an embodiment of the invention, the material of the shielding layer includes silver paste or conductive graphite.

According to an embodiment of the invention, the touch module further includes a first substrate and a second substrate. The first sensing electrode layer, the first circuit layer, and the shielding layer are disposed on the first substrate, and the second sensing electrode layer and the second circuit layer are disposed on the second substrate.

According to an embodiment of the invention, the touch module further includes a substrate. The substrate has a first surface and a second surface opposite to each other. The first sensing electrode layer and the first circuit layer are disposed on the first surface of the substrate, and the second sensing electrode layer, the second circuit layer, and the shielding layer are disposed on the second surface of the substrate.

According to an embodiment of the invention, the touch module further includes a substrate. The substrate has a surface. The first sensing electrode layer, the first circuit layer, the second sensing electrode layer, the second circuit layer, and the shielding layer are disposed on the surface of the substrate.

According to an embodiment of the invention, the first sensing electrode layer, the first circuit layer, the second sensing electrode layer, the second circuit layer, and the shielding layer are disposed on the cover.

According to an embodiment of the invention, the touch module further includes a substrate. The first sensing electrode layer and the first circuit layer are disposed on the cover, the second sensing electrode layer and the second circuit layer are disposed on the substrate, and the shielding layer is disposed on the cover or the substrate.

According to an embodiment of the invention, the touch module further includes a display module. The display module includes a display panel. The display panel includes an upper glass and a lower glass. The upper glass is located between the lower glass and the cover. The upper glass has a surface, and the surface faces the cover. The first sensing electrode layer, the first circuit layer, the second sensing electrode layer, the second circuit layer, and the shielding layer are disposed on the surface of the upper glass.

According to an embodiment of the invention, the touch module further includes a display module. The display module includes a display panel. The display panel includes an upper glass and a lower glass. The upper glass is located between the lower glass and the cover. The lower glass has a surface, and the surface faces the upper glass. The first sensing electrode layer, the first circuit layer, the second sensing electrode layer, the second circuit layer, and the shielding layer are disposed on the surface of the lower glass.

According to an embodiment of the invention, the touch module further includes at least one insulation layer. The at least one insulation layer is disposed between the first circuit layer and the shielding layer or between the second circuit layer and the shielding layer.

According to an embodiment of the invention, the number of the at least one insulation layer is two. One of the two insulation layers is disposed between the first circuit layer and the shielding layer, and the other one of the two insulation layers is disposed between the second circuit layer and the shielding layer.

According to an embodiment of the invention, an extension portion of the at least one insulation layer is extended along the direction perpendicular to the surface of the cover and encapsulates at least one of the first circuit layer, the second circuit layer, and the shielding layer, and a minimum thickness of the extension portion along a direction parallel to the surface of the cover is greater than 0.3 mm.

According to an embodiment of the invention, the touch module further includes a passivation layer. The passivation layer covers at least two of the first sensing electrode layer, the first circuit layer, the second sensing electrode layer, the second circuit layer, the shielding layer, and the insulation layer.

According to an embodiment of the invention, an extension portion of the passivation layer is extended along the direction perpendicular to the surface of the cover and encapsulates at least two of the first circuit layer, the second circuit layer, the shielding layer, and the insulation layer, and a minimum thickness of the extension portion along a direction parallel to the surface of the cover is greater than 0.3 mm.

According to an embodiment of the invention, the blocking layer and the non-sensing area completely overlap each other along the direction perpendicular to the surface of the cover.

As described above, an embodiment of the invention has at least one of following advantages. In an embodiment of the invention, a shielding layer is disposed between a first circuit layer and a second circuit layer in a non-sensing area of a touch module, such that the first circuit layer and the second circuit layer could be disposed overlapping each other without causing any serious electrical interference. When the first circuit layer and the second circuit layer are disposed overlapping each other, the total width of the first circuit layer and the second circuit layer is reduced, and accordingly, the width of the non-sensing area and a blocking layer in the touch module is reduced, which meets today's trend of narrow border design of touch devices.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention could be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
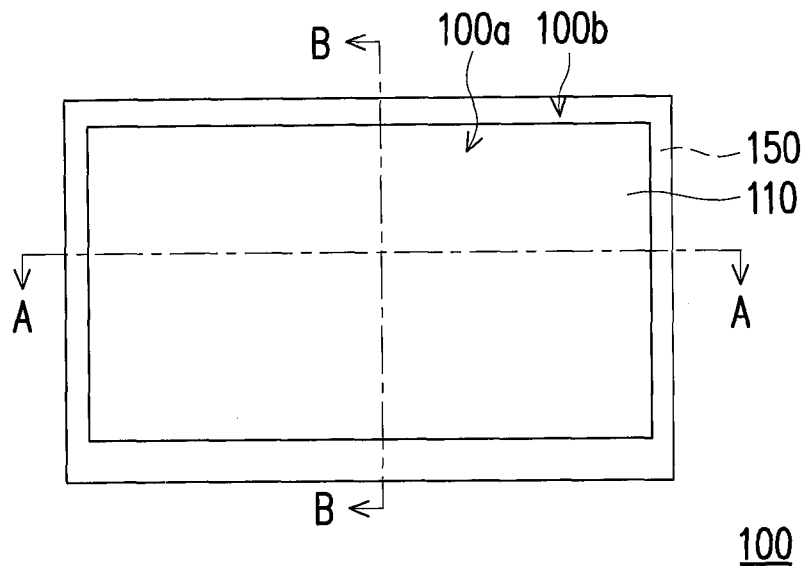
FIG. 1 is a diagram of a touch module according to an embodiment of the invention.

FIG. 1 is a diagram of a touch module according to an embodiment of the invention. Referring to FIG. 1, the touch module 100 in the present embodiment has a sensing area 100a and a non-sensing area 100b, where the non-sensing area 100b surrounds the sensing area 100a. The touch module 100 could be applied to a touch device, such as a tablet PC or a smart phone. However, the application of the touch module 100 is not limited in the present invention. A user could perform touch inputs in the sensing area 100a to operate the touch device.

Figure 2:
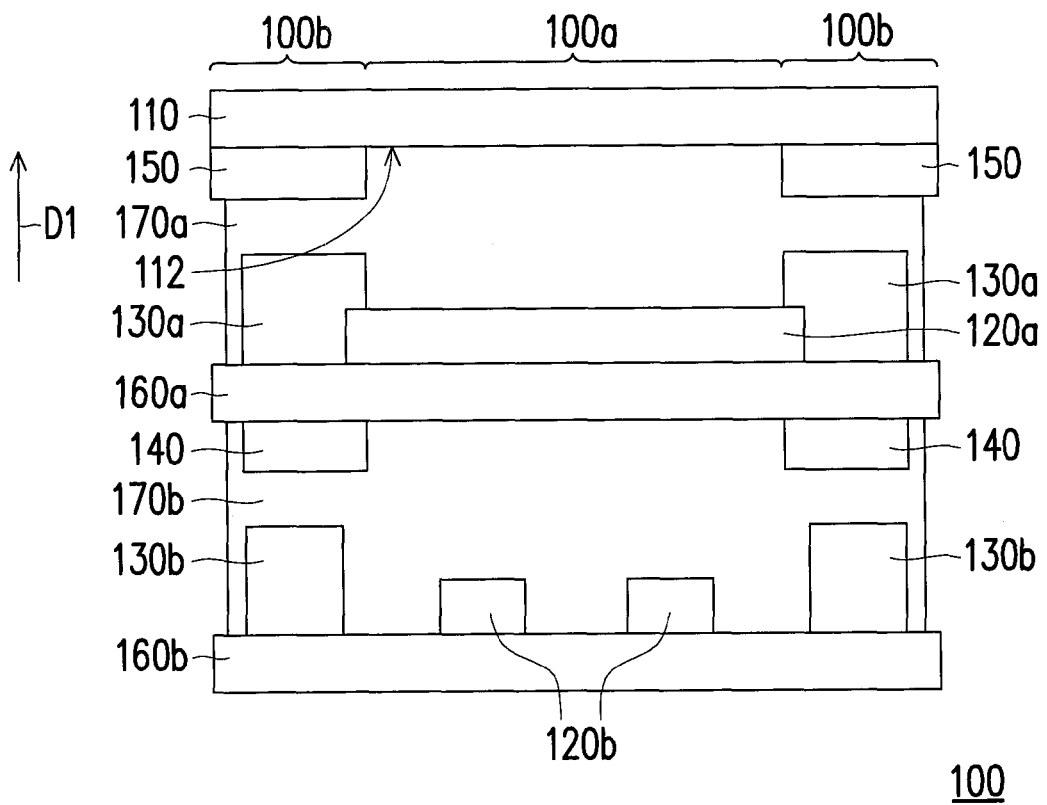
FIG. 2 is a cross-sectional view of the touch module in FIG. 1 along line A-A.
Figure 3:
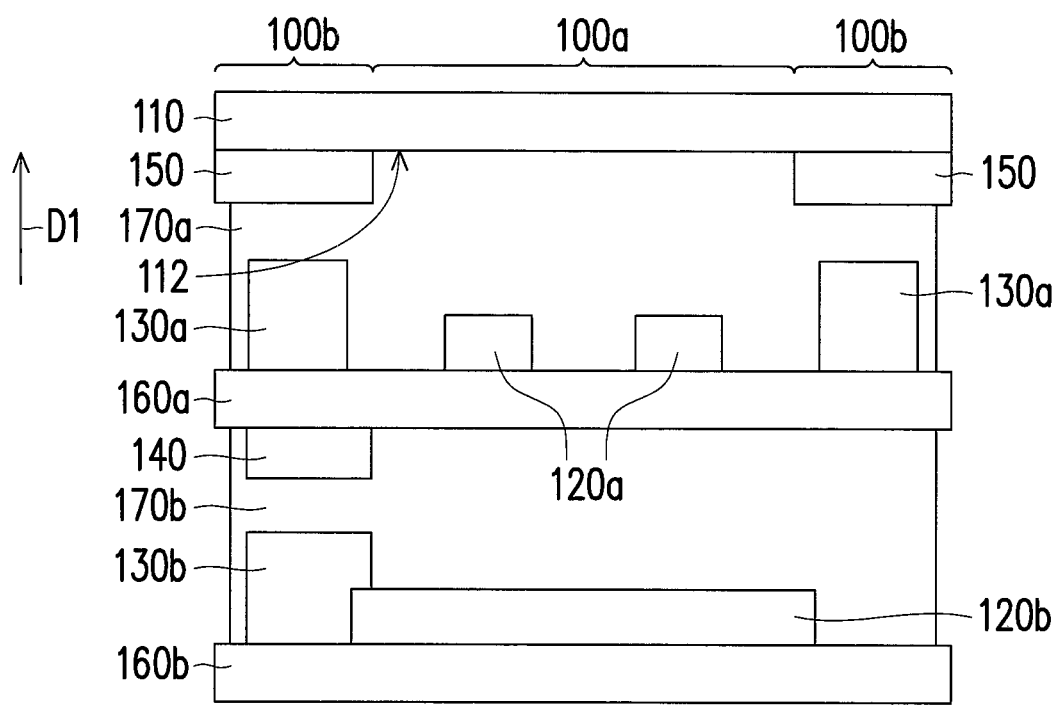
FIG. 3 is a cross-sectional view of the touch module in FIG. 1 along line B-B.

FIG. 2 is a cross-sectional view of the touch module in FIG. 1 along line A-A. FIG. 3 is a cross-sectional view of the touch module in FIG. 1 along line B-B. Referring to FIG. 1 to FIG. 3, the touch module 100 includes a cover 110, a first sensing electrode layer 120a, a second sensing electrode layer 120b, a first circuit layer 130a, a second circuit layer 130b, a shielding layer 140, and a blocking layer 150. The cover 110 covers the sensing area 100a and the non-sensing area 100b and has a surface 112. The touch module 100 could be integrated with a display module (not shown in FIGS. 1-3) into a touch display module. The cover 110 may be a glass cover or a transparent plastic cover such that a user could view images displayed on the display panel through the cover 110.

The first sensing electrode layer 120a and the second sensing electrode layer 120b are disposed in the sensing area 100a and are respectively configured to sense touch inputs performed by the user along different directions. The first circuit layer 130a and the second circuit layer 130b are disposed in the non-sensing area 100b and are electrically connected to the first sensing electrode layer 120a and the second sensing electrode layer 120b respectively for transmitting sensing signals of the first sensing electrode layer 120a and the second sensing electrode layer 120b respectively. The first circuit layer 130a and the second circuit layer 130b at least partially overlap each other along a direction D1 perpendicular to the surface 112 of the cover 110. The shielding layer 140 is disposed in the non-sensing area 100b and located between the first circuit layer 130a and the second circuit layer 130b. The blocking layer 150 is disposed on the surface 112 of the cover 110 and located in the non-sensing area 100b. The blocking layer 150 at least partially overlaps the first circuit layer 130a, the second circuit layer 130b, and the shielding layer 140 along the direction D1 perpendicular to the surface 112 of the cover 110 to block the first circuit layer 130a, the second circuit layer 130b, and the shielding layer 140, so as to allow the touch module 100 to have an appealing appearance. In the present embodiment, the blocking layer 150 may be an ink layer or any other suitable non-transmissive layer. However, the material of the blocking layer 150 is not limited in the present invention.

With the disposition described above, the shielding layer 140 is disposed between the first circuit layer 130a and the second circuit layer 130b in the non-sensing area 100b of the touch module 100, so that the first circuit layer 130a and the second circuit layer 130b could be disposed overlapping each other without causing any serious electrical interference to each other. When the first circuit layer 130a and the second circuit layer 130b are disposed overlapping each other, as shown in FIG. 2 and FIG. 3, the total width of the first circuit layer 130a and the second circuit layer 130b is reduced, and accordingly the width of the non-sensing area 100b and the blocking layer 150 in the touch module 100 is reduced, which is advantageous to the narrow border design of the touch device and increases the size of the sensing area 100a.

In the present embodiment, the blocking layer 150 and the non-sensing area 100b completely overlap each other along the direction D1 perpendicular to the surface 112 of the cover 110, so that the blocking layer 150 could actually block the first circuit layer 130a, the second circuit layer 130b, and the shielding layer 140 in the non-sensing area 100b but not block the display area of the display panel.

The touch module 100 in the present embodiment may have a Glass/Film/Film (G/F/F) design. In more detail, the touch module 100 further includes a first substrate 160a and a second substrate 160b, as shown in FIG. 2 and FIG. 3. The first substrate 160a and the second substrate 160b are plastic films, and the cover 110 is a glass substrate. The first sensing electrode layer 120a, the first circuit layer 130a, and the shielding layer 140 are disposed on the first substrate 160a, and the second sensing electrode layer 120b and the second circuit layer 130b are disposed on the second substrate 160b. In the present embodiment, the first sensing electrode layer 120a including a transparent electrode pattern and the second sensing electrode layer 120*b* including a transparent electrode pattern may be fabricated through an etching process, a laser process, or any other suitable process. The material of the first sensing electrode layer 120*a* and the second sensing electrode layer 120*b* may be indium tin oxide (ITO) or any other suitable transparent conductive oxide (TCO). In addition, the first circuit layer 130*a* and the second circuit layer 130*b* may be fabricated by using silver paste, copper, or any other suitable conductive material through printing, coating, film coating (sputtering, evaporating, or any other film coating process), or ultrasonic spraying.

In the present embodiment, the material of the shielding layer 140 may be silver paste, conductive graphite, or any other suitable shielding material, which is not limited in the present invention. In more detail, silver paste, conductive graphite, or any other suitable shielding material is disposed on the first substrate 160*a* through printing, coating, film coating (sputtering, evaporating, or any other film coating process), or ultrasonic spraying. In addition, the touch module 100 further includes an optical adhesive layer 170*a* and an optical adhesive layer 170*b*. The optical adhesive layer 170*a* is applied to bond the first substrate 160*a* and the cover 110, and the optical adhesive layer 170*b* is applied to bond the first substrate 160*a* and the second substrate 160*b*.

The style of the touch module is not limited in the present invention, and besides the G/F/F design mentioned above, the touch module may also have a Glass/Film (G/F) design, a Glass/Glass (G/G) design, an One Glass design, a design in which the sensing electrode layers and circuit layers are disposed on a display module (On Cell), a design in which the sensing electrode layers and circuit layers are disposed in a display module (In Cell), or any other suitable design. Below, examples of these touch module styles will be explained with reference to accompanying drawings.

Figure 4:
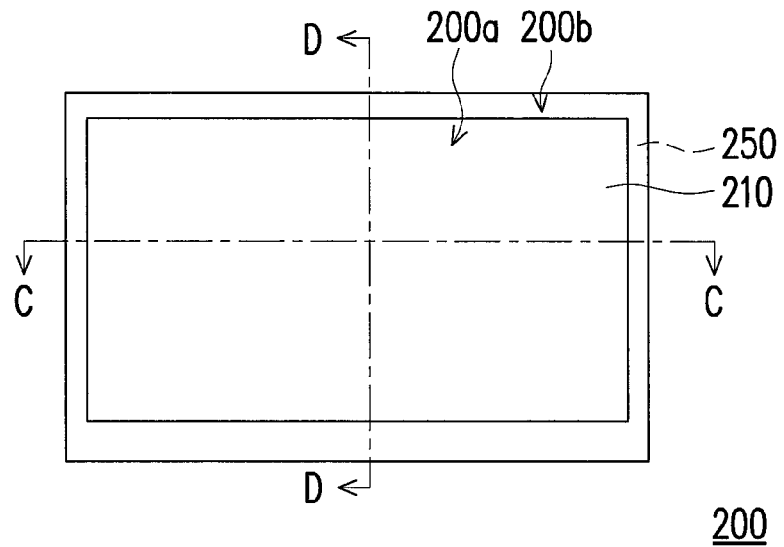
FIG. 4 is a diagram of a touch module according to another embodiment of the invention.
Figure 5:
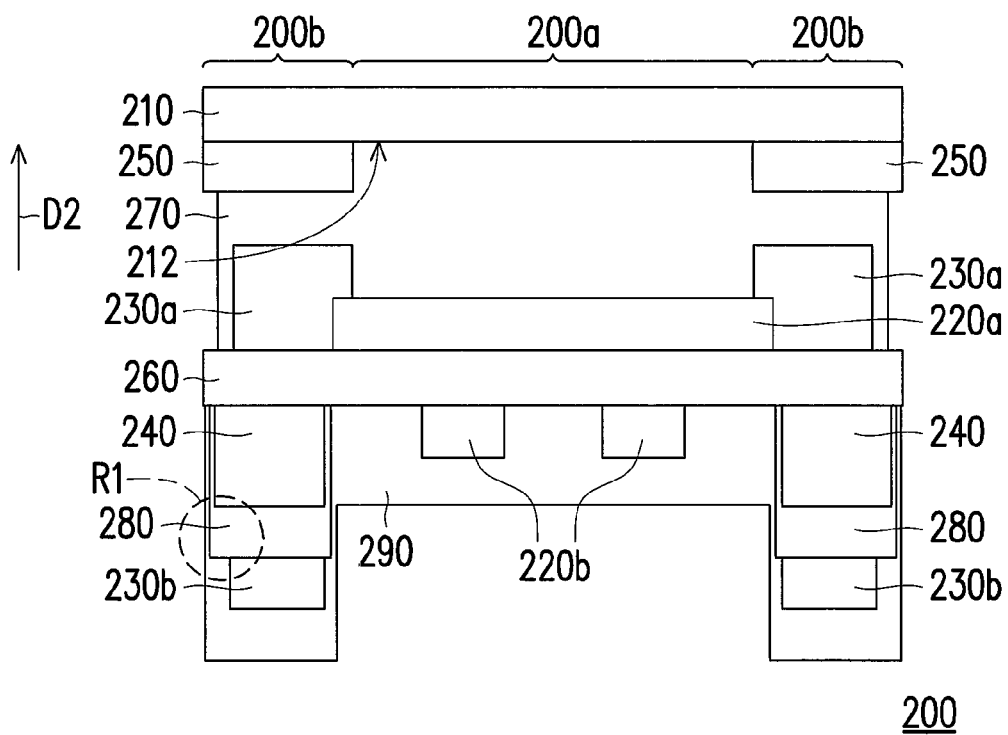
FIG. 5 is a cross-sectional view of the touch module in FIG. 4 along line C-C.
Figure 6:
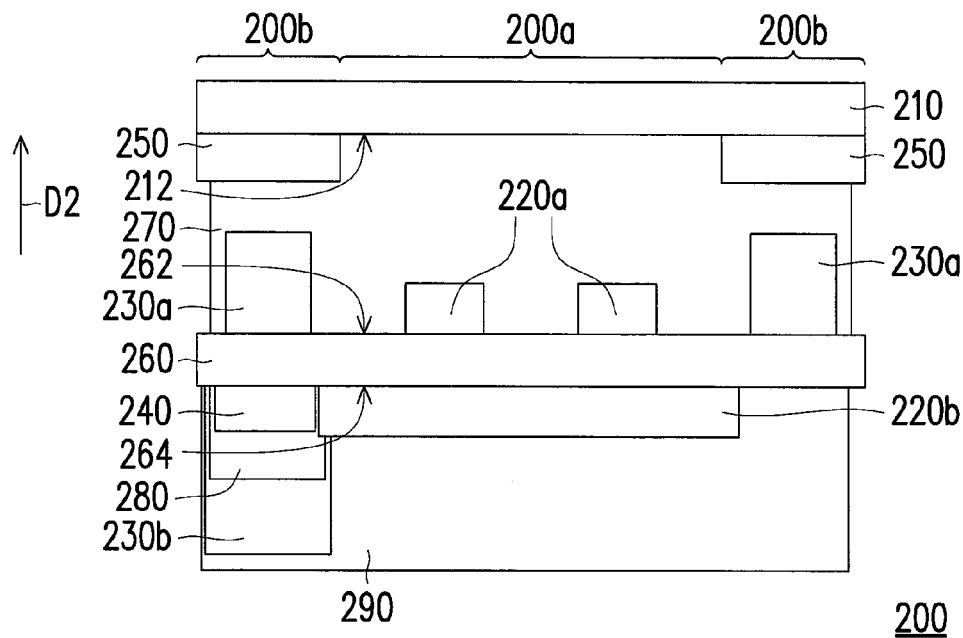
FIG. 6 is a cross-sectional view of the touch module in FIG. 4 along line D-D.

FIG. 4 is a diagram of a touch module according to another embodiment of the invention. FIG. 5 is a cross-sectional view of the touch module in FIG. 4 along line C-C. FIG. 6 is a cross-sectional view of the touch module in FIG. 4 along line D-D. Referring to FIG. 4 to FIG. 6, the relative positions between the cover 210, the first circuit layer 230*a*, the second circuit layer 230*b*, the shielding layer 240, and the blocking layer 250 of the touch module 200 in the present embodiment is similar to that in the embodiment illustrated in FIGS. 1-3 therefore will not be described again. Through the disposition of the shielding layer 240, the first circuit layer 230*a* and the second circuit layer 230*b* could be disposed overlapping each other without causing any serious electrical interference. When the first circuit layer 230*a* and the second circuit layer 230*b* are disposed overlapping each other, as shown in FIG. 5 and FIG. 6, the total width of the first circuit layer 230*a* and the second circuit layer 230*b* is reduced, and accordingly the width of the non-sensing area 200*b* and the blocking layer 250 in the touch module 200 is reduced, which is advantageous to the narrow border design of the touch device and increases the size of the sensing area 200*a*.

The difference between the touch module 200 in the present embodiment and the touch module 100 illustrated in FIG. 1-3 is that the touch module 200 has a G/F design. In more detail, the touch module 200 further includes a substrate 260. The substrate 260 is a single plastic film, and the cover 210 is a single glass substrate. The substrate 260 has a first surface 262 and a second surface 264 opposite to each other. The first sensing electrode layer 220*a* and the first circuit layer 230*a* are disposed on the first surface 262 of the substrate 260, and the second sensing electrode layer 220*b*, the second circuit layer 230*b*, and the shielding layer 240 are disposed on the second surface 264 of the substrate 260. The touch module 200 further includes an optical adhesive layer 270. The optical adhesive layer 270 is applied to bond the substrate 260 and the cover 210.

Referring to FIG. 5 and FIG. 6, the touch module 200 in the present embodiment further includes an insulation layer 280. The insulation layer 280 is disposed between the second circuit layer 230*b* and the shielding layer 240 to prevent the second circuit layer 230*b* and the shielding layer 240 from being electrically connected. In more detail, as shown in FIG. 6, the insulation layer 280 is also disposed between the second sensing electrode layer 220*b* and the shielding layer 240 to prevent the second sensing electrode layer 220*b* and the shielding layer 240 from being electrically connected. Additionally, the touch module 200 further includes a passivation layer 290. The passivation layer 290 covers the second sensing electrode layer 220*b*, the second circuit layer 230*b*, and the insulation layer 280 to prevent the second sensing electrode layer 220*b*, the second circuit layer 230*b*, and the insulation layer 280 from being exposed. The material of the insulation layer 280 and the passivation layer 290 may be SiO2 or any other suitable insulative material, which is not limited in the present invention.

Figure 7:
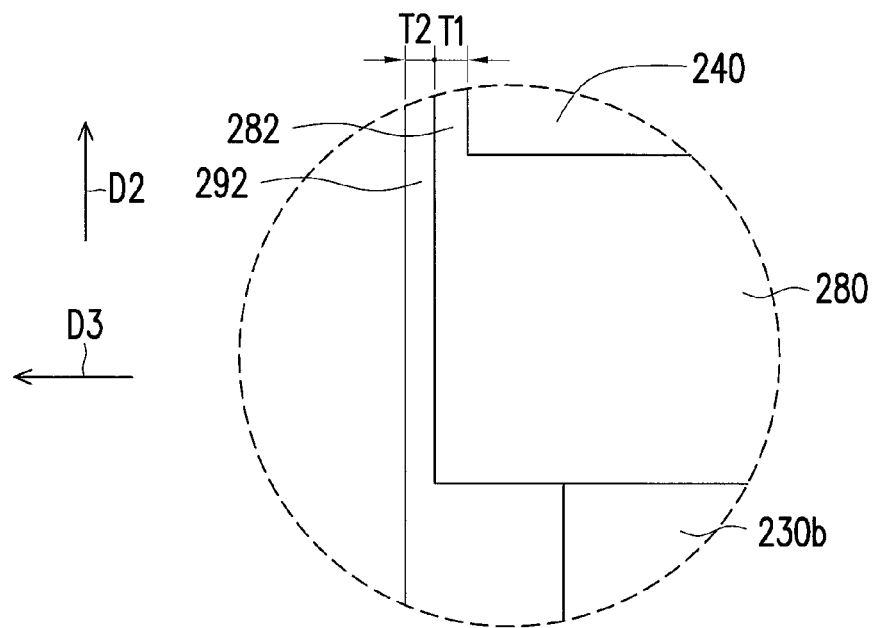
FIG. 7 is an enlarged view of the touch module in FIG. 5 in an area R1.

FIG. 7 is an enlarged view of the touch module in FIG. 5 in an area R1. Referring to FIG. 5 and FIG. 7, in more detail, an extension portion 282 of the insulation layer 280 is extended along a direction D2 perpendicular to a surface 212 of the cover 210 and encapsulates the shielding layer 240, and an extension portion 292 of the passivation layer 290 is extended along the direction D2 perpendicular to the surface 212 of the cover 210 and encapsulates the second circuit layer 230*b* and the insulation layer 280. The minimum thickness T1 of the extension portion 282 of the insulation layer 280 along the direction D3 parallel to the surface 212 of the cover 210 may be greater than 0.3 mm, so that the insulation layer 280 offers a good insulation effect. Besides, the minimum thickness T2 of the extension portion 292 of the passivation layer 290 along the direction D3 parallel to the surface 212 of the cover 210 may be greater than 0.3 mm, so that the passivation layer 290 offers a good passivation effect.

Figure 8:
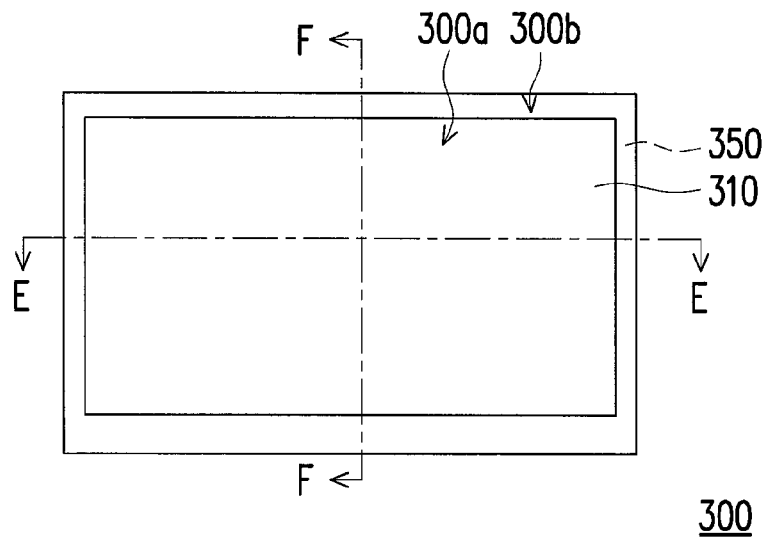
FIG. 8 is a diagram of a touch module according to another embodiment of the invention.
Figure 9:
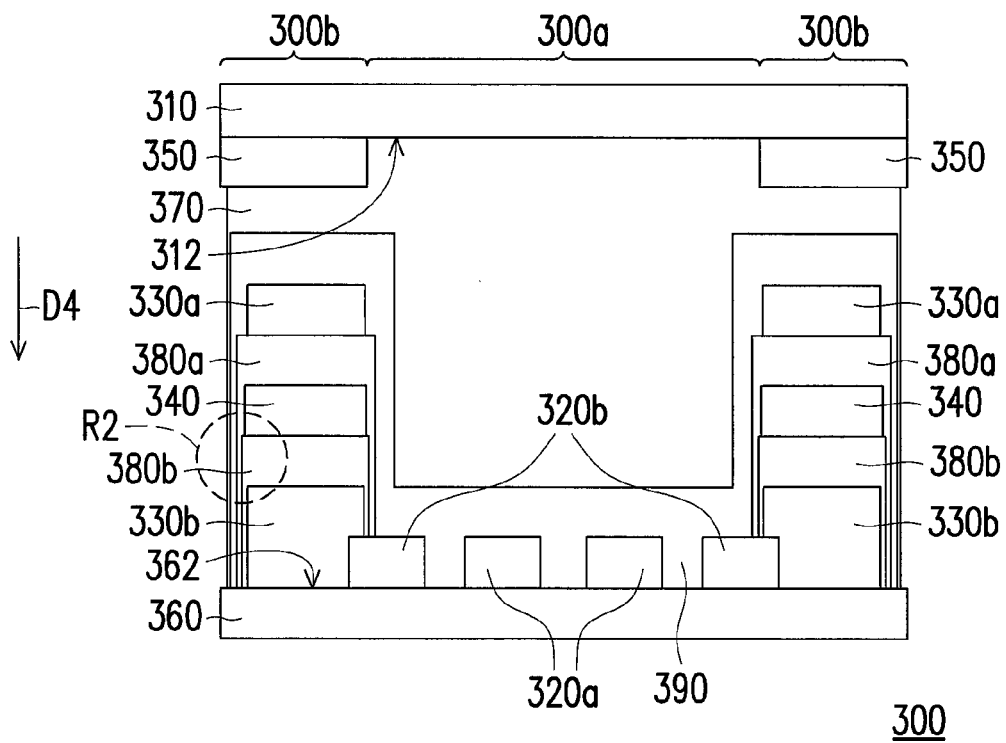
FIG. 9 is a cross-sectional view of the touch module in FIG. 8 along line E-E.
Figure 10:
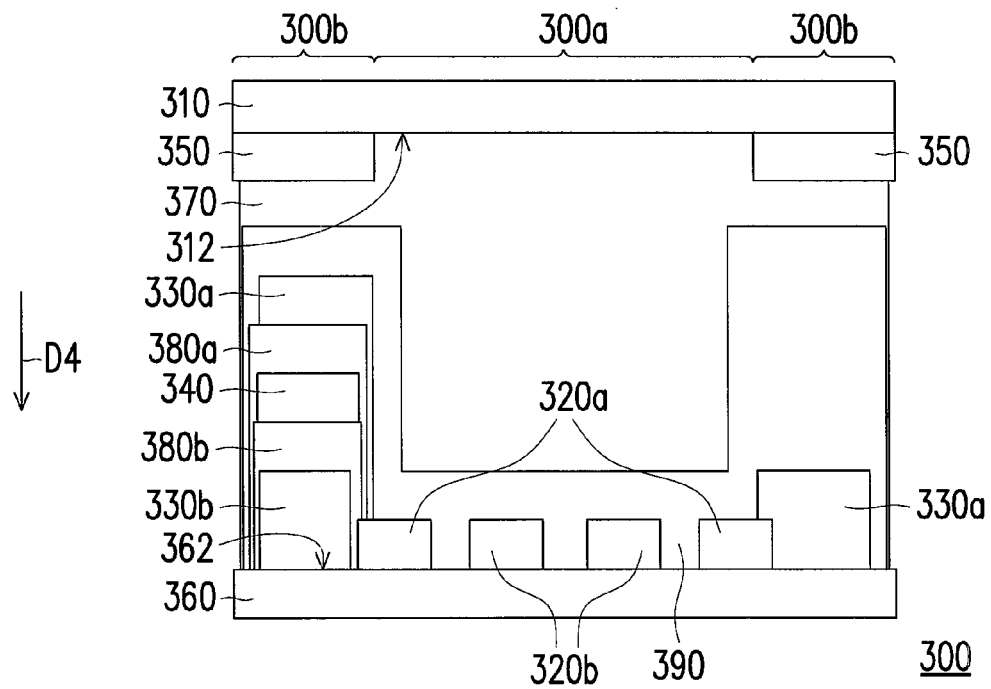
FIG. 10 is a cross-sectional view of the touch module in FIG. 8 along line F-F.

FIG. 8 is a diagram of a touch module according to another embodiment of the invention. FIG. 9 is a cross-sectional view of the touch module in FIG. 8 along line E-E. FIG. 10 is a cross-sectional view of the touch module in FIG. 8 along line F-F. Referring to FIG. 8 to FIG. 10, the relative positions between the cover 310, the first circuit layer 330*a*, the second circuit layer 330*b*, the shielding layer 340, and the blocking layer 350 of the touch module 300 in the present embodiment is similar to those in the embodiment illustrated in FIGS. 1-3 therefore will not be described herein. Through the disposition of the shielding layer 340, the first circuit layer 330*a* and the second circuit layer 330*b* could be disposed overlapping each other without causing any serious electrical interference. When the first circuit layer 330*a* and the second circuit layer 330*b* are disposed overlapping each other, as shown in FIG. 9 and FIG. 10, the total width of the first circuit layer 330*a* and the second circuit layer 330*b* is reduced, and accordingly the width of the non-sensing area 300*b* and the blocking layer 350 of the touch module 300 is reduced, which is advantageous to the narrow border design of the touch device and increases the size of the sensing area 300*a*.

The difference between the touch module 300 in the present embodiment and the touch module 100 illustrated in FIGS. 1-3 is that the touch module 300 has a G/G design. In more detail, the touch module 300 further includes a substrate 360, and the cover 310 and the substrate 360 are two glass substrates. The substrate 360 has a surface 362, and the first sensing electrode layer 320a, the first circuit layer 330a, the second sensing electrode layer 320b, the second circuit layer 330b, and the shielding layer 340 are disposed on the surface 362 of the substrate 360. The first sensing electrode layer 320a and the second sensing electrode layer 320b constitute a single-layer electrode structure. The touch module 300 further includes an optical adhesive layer 370. The optical adhesive layer 370 is applied to bond the substrate 360 and the cover 310.

Referring to FIG. 9 and FIG. 10, the touch module 300 in the present embodiment further includes an insulation layer 380a and an insulation layer 380b. The insulation layer 380a is disposed between the first circuit layer 330a and the shielding layer 340 to prevent the first circuit layer 330a and the shielding layer 340 from being electrically connected. The insulation layer 380b is disposed between the second circuit layer 330b and the shielding layer 340 to prevent the second circuit layer 330b and the shielding layer 340 from being electrically connected. In addition, the touch module 300 further includes a passivation layer 390. The passivation layer 390 covers the first sensing electrode layer 320a, the second sensing electrode layer 320b, the first circuit layer 330a, and the insulation layer 380a to prevent the first sensing electrode layer 320a, the second sensing electrode layer 320b, the first circuit layer 330a, and the insulation layer 380a from being exposed. The material of the insulation layer 380a, the insulation layer 380b, and the passivation layer 390 may be SiO2 or any other suitable insulative material, which is not limited in the present invention.

Figure 11:
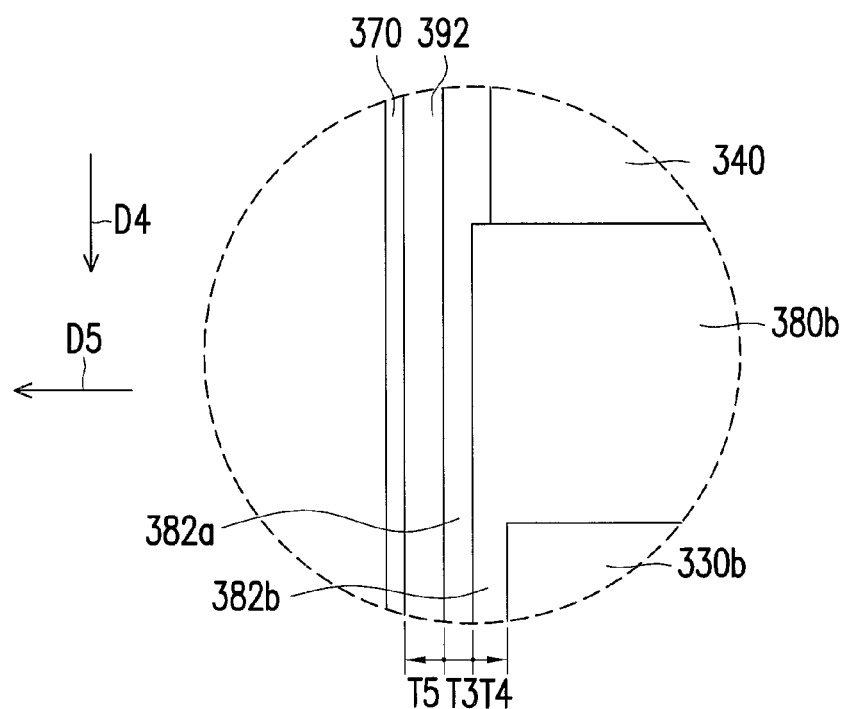
FIG. 11 is an enlarged view of the touch module in FIG. 9 in an area R2.

FIG. 11 is an enlarged view of the touch module in FIG. 9 in an area R2. Referring to FIG. 9 and FIG. 11, in more detail, an extension portion 382a of the insulation layer 380a is extended along the direction D4 perpendicular to a surface 312 of the cover 310 and encapsulates the shielding layer 340 and the insulation layer 380b. An extension portion 382b of the insulation layer 380b is extended along the direction D4 perpendicular to the surface 312 of the cover 310 and encapsulates the second circuit layer 330b. An extension portion 392 of the passivation layer 390 is extended along the direction D4 perpendicular to the surface 312 of the cover 310 and encapsulates the first circuit layer 330a and the insulation layer 380a. The minimum thickness T3 of the extension portion 382a of the insulation layer 380a along a direction D5 parallel to the surface 312 of the cover 310 may be greater than 0.3 mm, so that the insulation layer 380a offers a good insulation effect. The minimum thickness T4 of the extension portion 382b of the insulation layer 380b along the direction D5 parallel to the surface 312 of the cover 310 may be greater than 0.3 mm, so that the insulation layer 380b offers a good insulation effect. Besides, the minimum thickness T5 of the extension portion 392 of the passivation layer 390 along the direction D5 parallel to the surface 312 of the cover 310 may be greater than 0.3 mm, so that the passivation layer 390 offers a good passivation effect.

Figure 12:
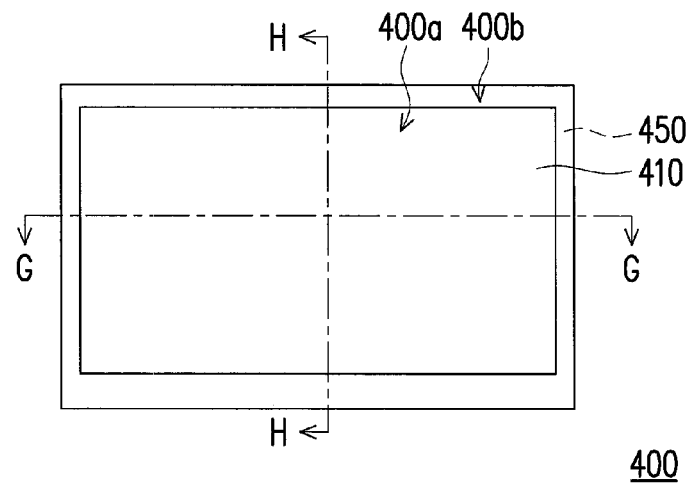
FIG. 12 is a diagram of a touch module according to another embodiment of the invention.
Figure 13:
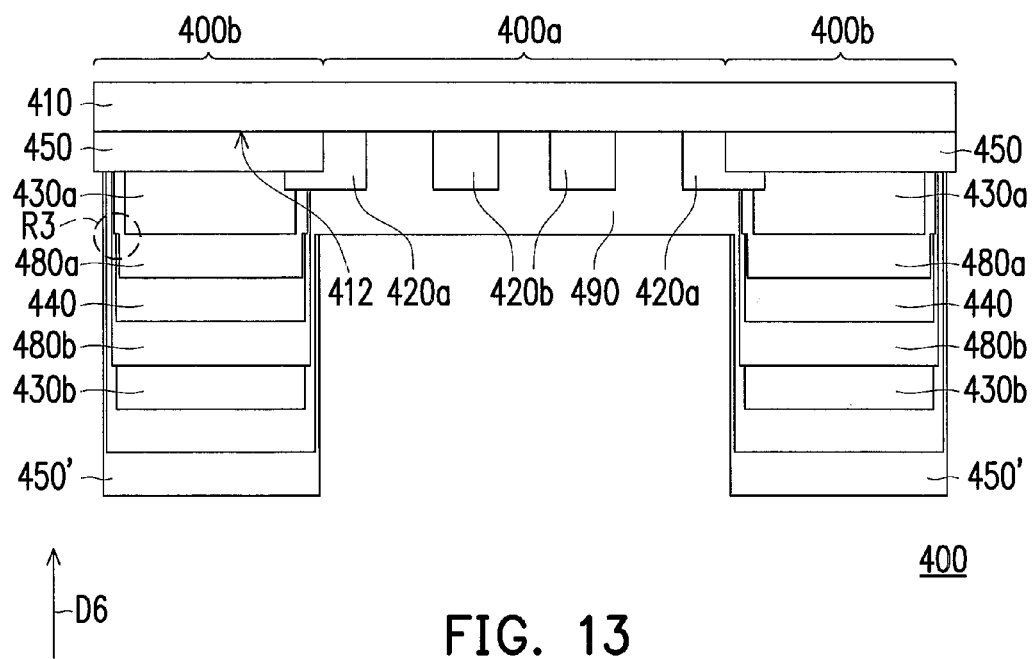
FIG. 13 is a cross-sectional view of the touch module in FIG. 12 along line G-G.
Figure 14:
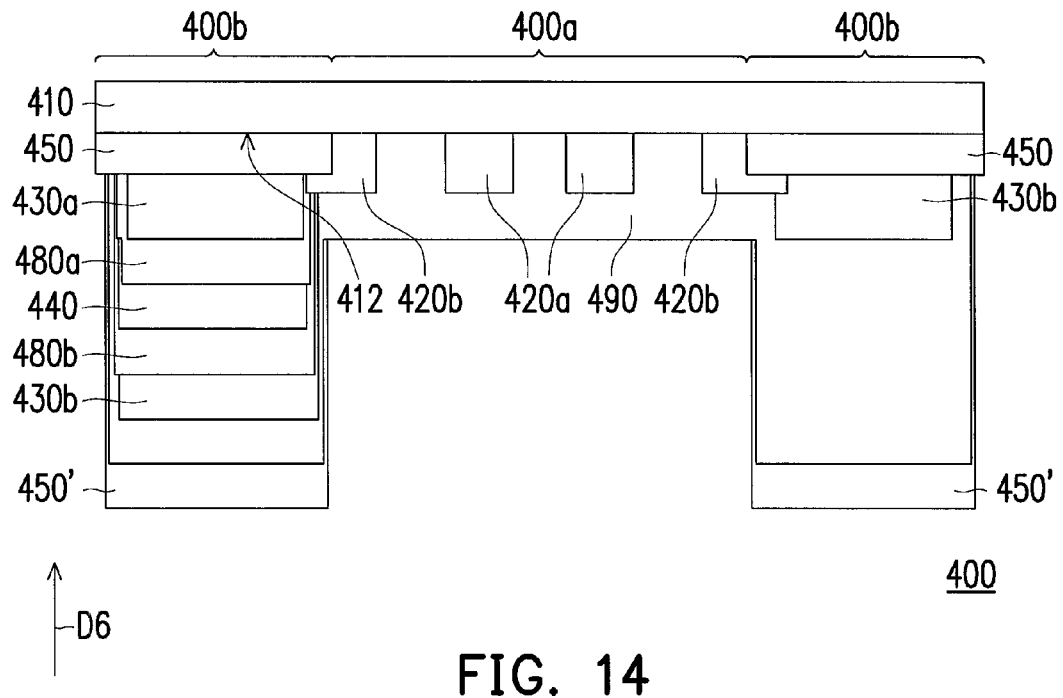
FIG. 14 is a cross-sectional view of the touch module in FIG. 12 along line H-H.

FIG. 12 is a diagram of a touch module according to another embodiment of the invention. FIG. 13 is a cross-sectional view of the touch module in FIG. 12 along line G-G. FIG. 14 is a cross-sectional view of the touch module in FIG. 12 along line H-H. Referring to FIG. 12 to FIG. 14, the relative positions between the cover 410, the first circuit layer 430a, the second circuit layer 430b, the shielding layer 440, and the blocking layer 450 of the touch module 400 in the present embodiment are similar to those in the embodiment illustrated in FIGS. 1-3 therefore will not be described herein. Through the disposition of the shielding layer 440, the first circuit layer 430a and the second circuit layer 430b could be disposed overlapping each other without causing any serious electrical interference. When the first circuit layer 430a and the second circuit layer 430b are disposed overlapping each other, as shown in FIG. 13 and FIG. 14, the total width of the first circuit layer 430a and the second circuit layer 430b is reduced, and accordingly the width of the non-sensing area 400b and the blocking layer 450 in the touch module 400 is reduced, which is advantageous to the narrow border design of the touch device and increases the size of the sensing area 400a.

The difference between the touch module 400 in the present embodiment and the touch module 100 illustrated in FIG. 1-3 is that the touch module 400 has a One Glass design. In more detail, the cover 410 is a single glass substrate, and the first sensing electrode layer 420a, the first circuit layer 430a, the second sensing electrode layer 420b, the second circuit layer 430b, and the shielding layer 440 are disposed on the cover 410. The first sensing electrode layer 420a and the second sensing electrode layer 420b constitute a single-layer electrode structure. In addition, the touch module 400 further includes a blocking layer 450'. The blocking layer 450' is disposed on the passivation layer 490 and located in the non-sensing area 400b. The blocking layer 450' at least partially overlaps the first circuit layer 430a, the second circuit layer 430b, and the shielding layer 440 along a direction D6 perpendicular to the surface 412 of the cover 410 to hide the first circuit layer 430a, the second circuit layer 430b, and the shielding layer 440, so as to allow the touch module 400 to achieve an appealing appearance.

Referring to FIG. 13 and FIG. 14, the touch module 400 in the present embodiment further includes an insulation layer 480a and an insulation layer 480b. The insulation layer 480a is disposed between the first circuit layer 430a and the shielding layer 440 to prevent the first circuit layer 430a and the shielding layer 440 from being electrically connected. Besides, the insulation layer 480a in FIG. 14 is also disposed between the first circuit layer 430a and the second sensing electrode layer 420b to prevent the first circuit layer 430a and the second sensing electrode layer 420b from being electrically connected. The insulation layer 480b is disposed between the second circuit layer 430b and the shielding layer 440 to prevent the second circuit layer 430b and the shielding layer 440 from being electrically connected. Additionally, the touch module 400 further includes a passivation layer 490. The passivation layer 490 covers the first sensing electrode layer 420a, the second sensing electrode layer 420b, the second circuit layer 430b, and the insulation layer 480b to prevent the first sensing electrode layer 420a, the second sensing electrode layer 420b, the second circuit layer 430b, and the insulation layer 480b from being exposed. The material of the insulation layer 480a, the insulation layer 480b, and the passivation layer 490 may be SiO2 or any other suitable insulative material, which is not limited in the present invention.

Figure 15:
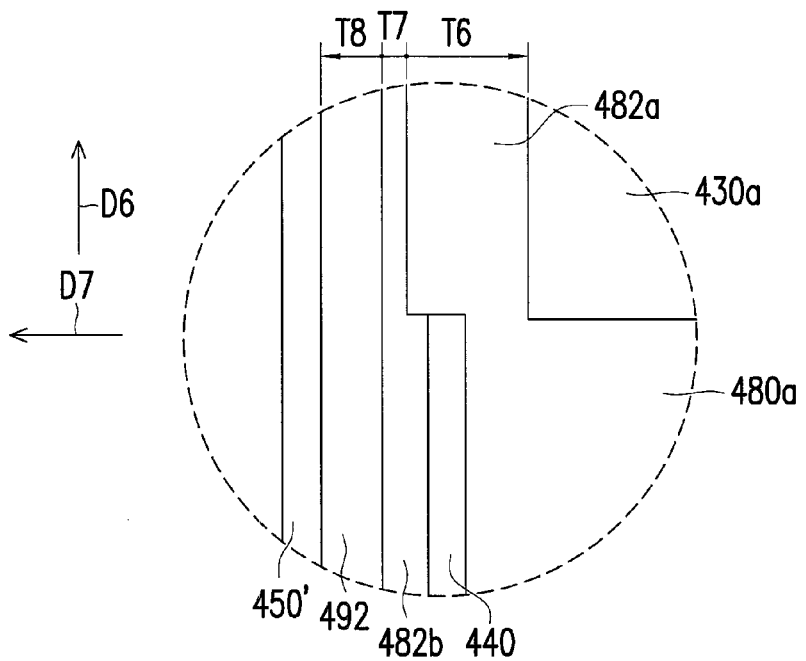
FIG. 15 is an enlarged view of the touch module in FIG. 13 in an area R3.

FIG. 15 is an enlarged view of the touch module in FIG. 13 in an area R3. Referring to FIG. 13 and FIG. 15, in more detail, an extension portion 482a of the insulation layer 480a is extended along the direction D6 perpendicular to the surface 412 of the cover 410 and encapsulates the first circuit layer 430a. An extension portion 482b of the insulation layer 480b is extended along the direction D6 perpendicular to the surface 412 of the cover 410 and encapsulates the shielding layer 440 and the insulation layer 480a. An extension portion 492 of the passivation layer 490 is extended along the direction D6 perpendicular to the surface 412 of the cover 410 and encapsulates the second circuit layer 430b, the insulation layer 480b, and the extension portion 482b of the insulation layer 480b. The minimum thickness T6 of the extension portion 482a of the insulation layer 480a along a direction D7 parallel to the surface 412 of the cover 410 may be greater than 0.3 mm, so that the insulation layer 480a offers a good insulation effect. The minimum thickness T7 of the extension portion 482b of the insulation layer 480b along the direction D7 parallel to the surface 412 of the cover 410 may be greater than 0.3 mm, so that the insulation layer 480b offers a good insulation effect. Besides, the minimum thickness T8 of the extension portion 492 of the passivation layer 490 along the direction D7 parallel to the surface 412 of the cover 410 may be greater than 0.3 mm, so that the passivation layer 490 offers a good passivation effect.

Figure 16:
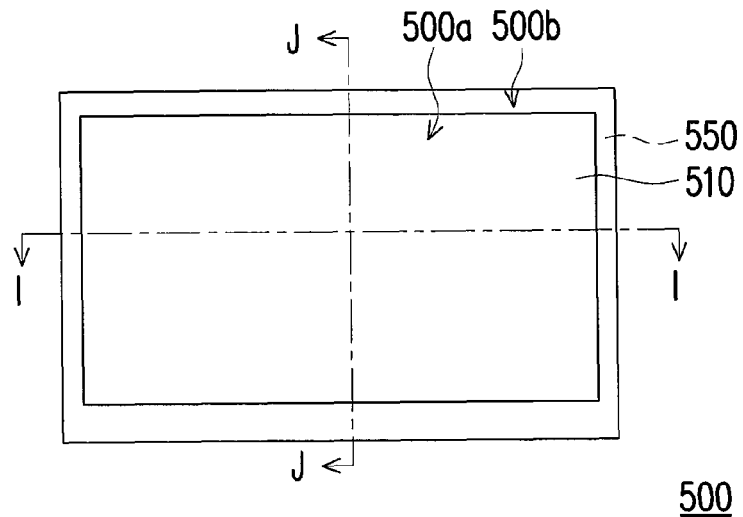
FIG. 16 is a diagram of a touch module according to another embodiment of the invention.
Figure 17:
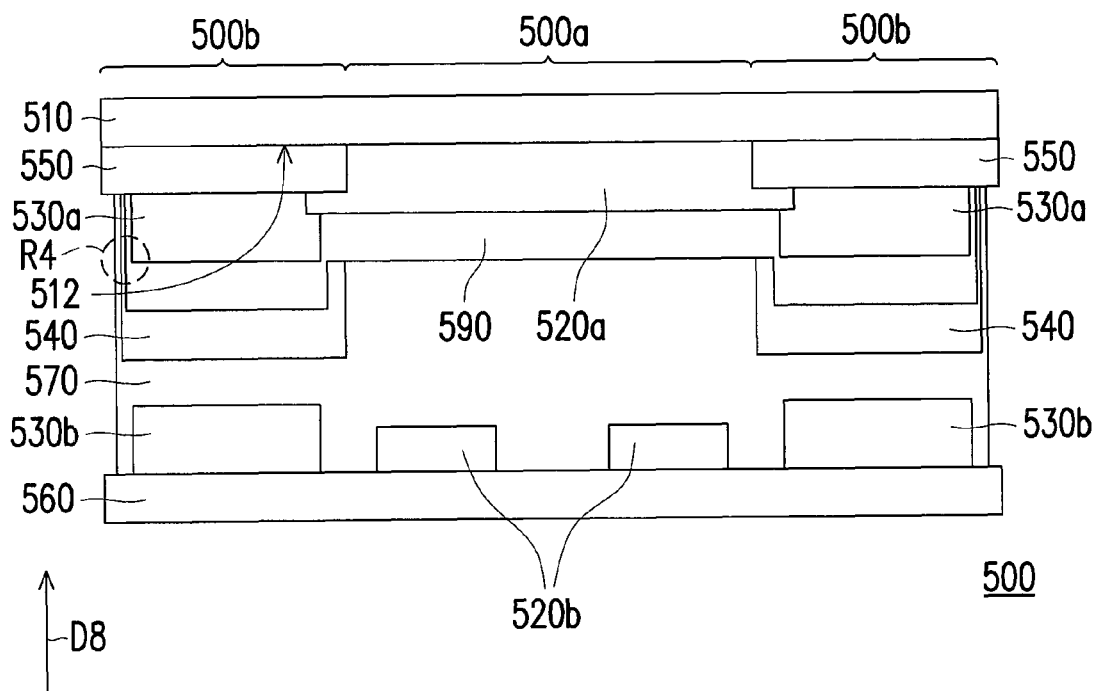
FIG. 17 is a cross-sectional view of the touch module in FIG. 16 along line I-I.
Figure 18:
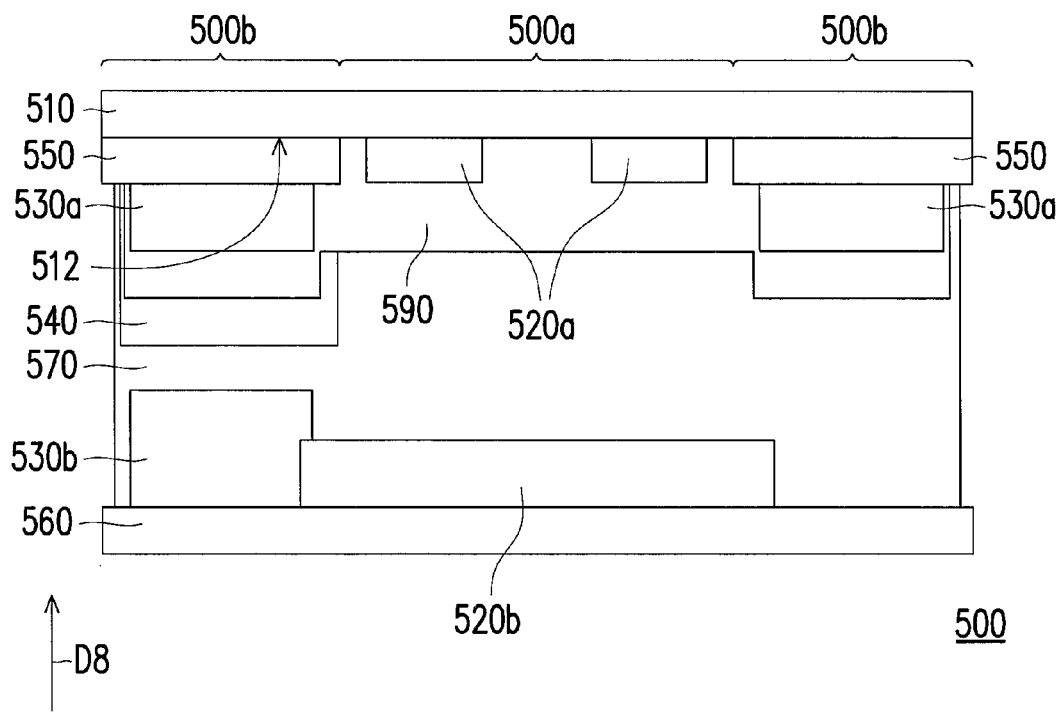
FIG. 18 is a cross-sectional view of the touch module in FIG. 17 along line J-J.

FIG. 16 is a diagram of a touch module according to another embodiment of the invention. FIG. 17 is a cross-sectional view of the touch module in FIG. 16 along line I-I. FIG. 18 is a cross-sectional view of the touch module in FIG. 17 along line J-J. Referring to FIG. 16 to FIG. 18, the relative positions between the cover 510, the first circuit layer 530a, the second circuit layer 530b, the shielding layer 540, and the blocking layer 550 of the touch module 500 in the present embodiment are similar to those in the embodiment illustrated in FIGS. 1-3 therefore will not be described herein. Through the disposition of the shielding layer 540, the first circuit layer 530a and the second circuit layer 530b could be disposed overlapping each other without causing any serious electrical interference to each other. When the first circuit layer 530a and the second circuit layer 530b are disposed overlapping each other, as shown in FIG. 17 and FIG. 18, the total width of the first circuit layer 530a and the second circuit layer 530b is reduced, and accordingly the width of the non-sensing area 500b and the blocking layer 550 in the touch module 500 is reduced, which is advantageous to the narrow border design of the touch device and increases the size of the sensing area 500a.

The difference between the touch module 500 in the present embodiment and the touch module 100 illustrated in FIGS. 1-3 is that the touch module 500 has a G/F design. In more detail, the touch module 500 further includes a substrate 560. The substrate 560 is a single plastic film, and the cover 510 is a single glass substrate. The first sensing electrode layer 520a and the first circuit layer 530a are disposed on the cover 510. The second sensing electrode layer 520b and the second circuit layer 530b are disposed on the substrate 560. The shielding layer 540 is disposed on the cover 510 or the substrate 560 (illustrated as being disposed on the cover 510). The touch module 500 further includes an optical adhesive layer 570. The optical adhesive layer 570 is applied to bond the substrate 560 and the cover 510.

Referring to FIG. 17 and FIG. 18, the touch module 500 in the present embodiment further includes a passivation layer 590. The passivation layer 590 covers the first sensing electrode layer 520a and the first circuit layer 530a to prevent the first sensing electrode layer 520a and the first circuit layer 530a from being exposed. In the present embodiment, the passivation layer 590 is extended between the first circuit layer 530a and the shielding layer 540 to prevent the first circuit layer 530a and the shielding layer 540 from being electrically connected. Accordingly, the passivation layer 590 could be considered as an insulation layer. The material of the passivation layer 590 may be SiO2 or any other suitable insulative material, which is not limited in the present invention.

Figure 19:
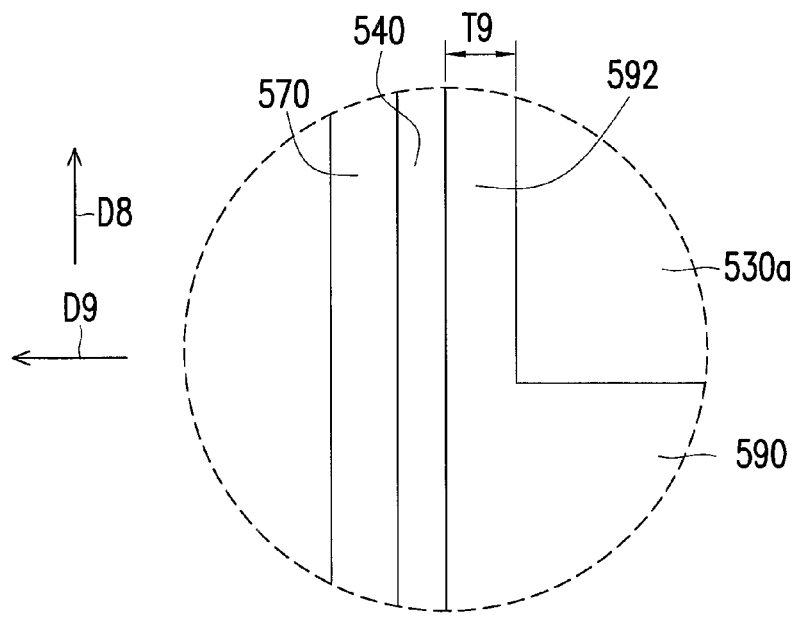
FIG. 19 is an enlarged view of the touch module in FIG. 17 in an area R4.

FIG. 19 is an enlarged view of the touch module in FIG. 17 in an area R4. Referring to FIG. 17 and FIG. 19, in more detail, an extension portion 592 of the passivation layer 590 is extended along a direction D8 perpendicular to the surface 512 of the cover 510 and encapsulates the first circuit layer 530a. The minimum thickness T9 of the extension portion 592 of the passivation layer 590 along a direction D9 parallel to the surface 512 of the cover 510 may be greater than 0.3 mm, so that the passivation layer 590 offers good passivation and insulation effects.

Figure 20:
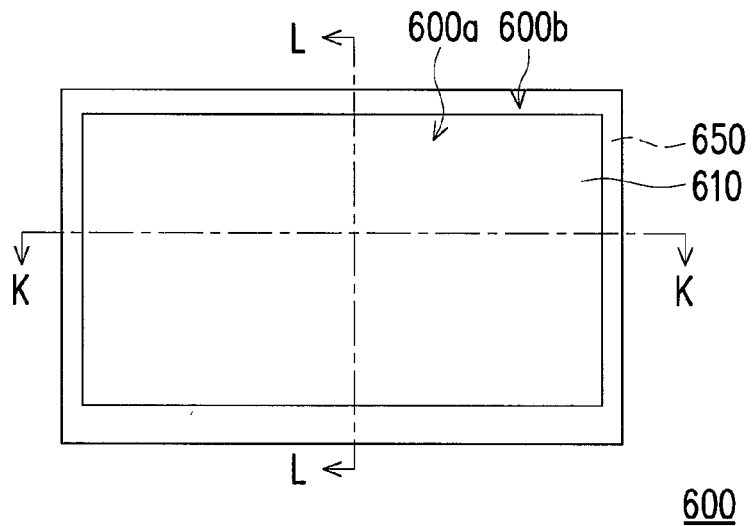
FIG. 20 is a diagram of a touch module according to another embodiment of the invention.
Figure 21:
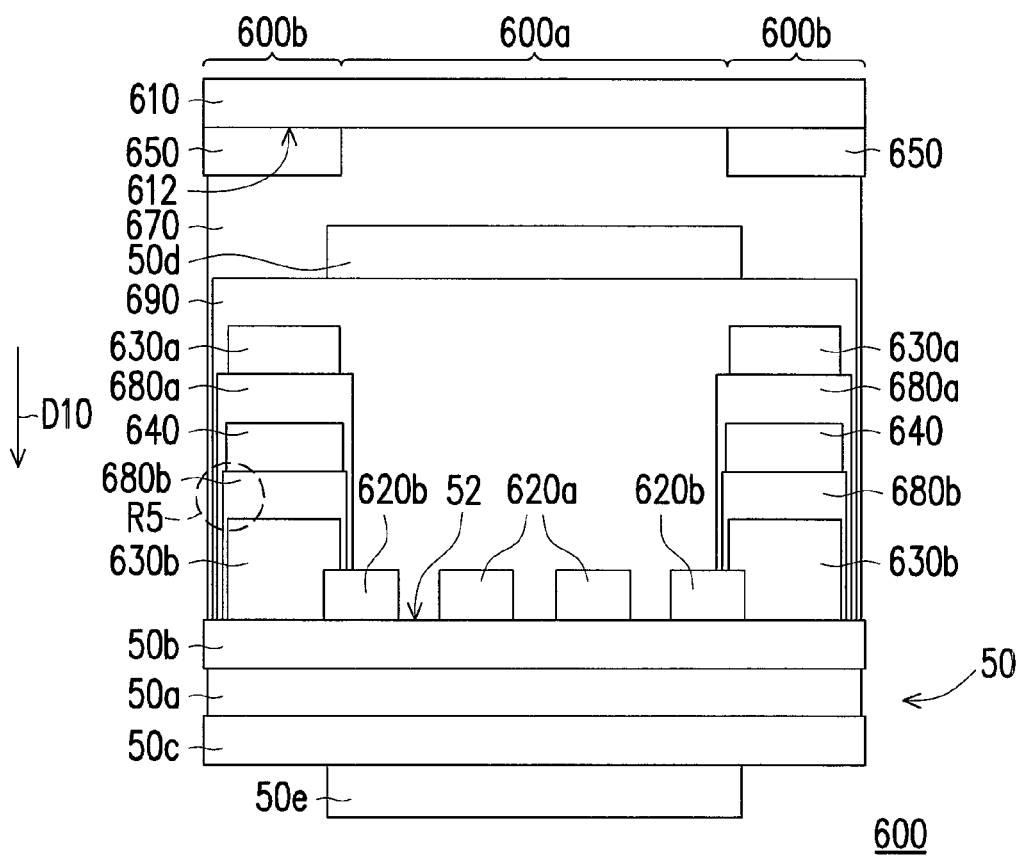
FIG. 21 is a cross-sectional view of the touch module in FIG. 20 along line K-K.
Figure 22:
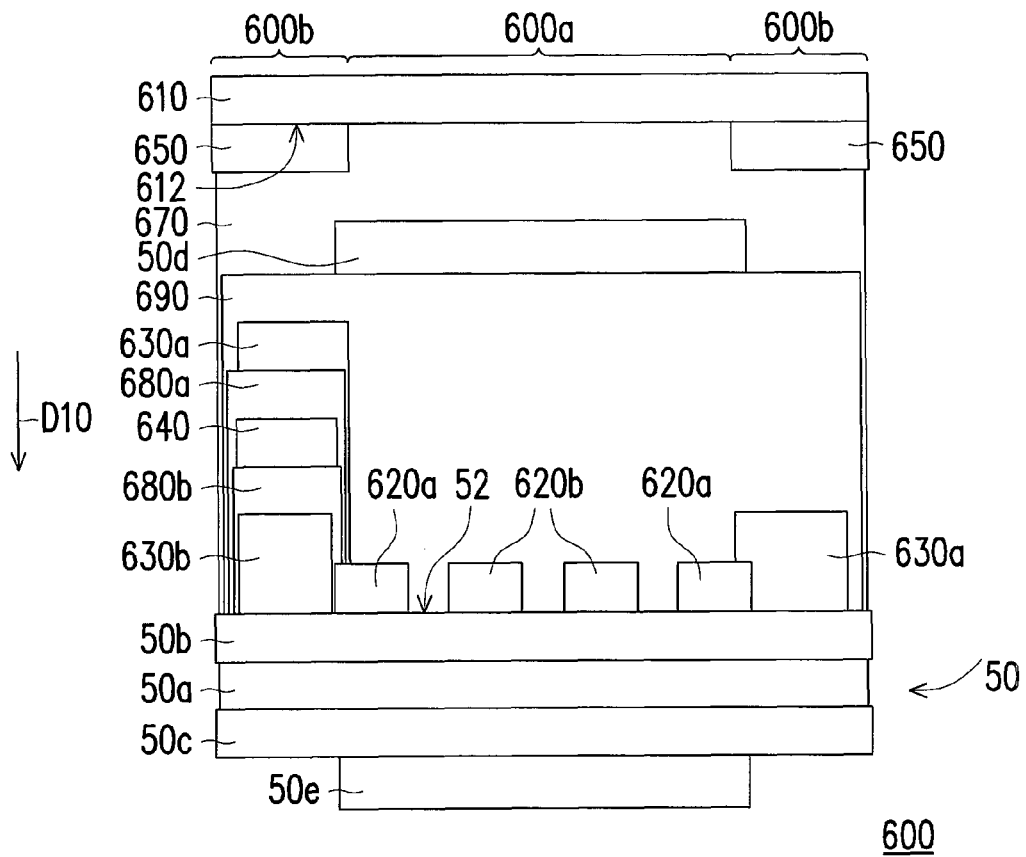
FIG. 22 is a cross-sectional view of the touch module in FIG. 20 along line L-L.

FIG. 20 is a diagram of a touch module according to another embodiment of the invention. FIG. 21 is a cross-sectional view of the touch module in FIG. 20 along line K-K. FIG. 22 is a cross-sectional view of the touch module in FIG. 20 along line L-L. Referring to FIG. 20 to FIG. 22, the relative positions between the cover 610, the first circuit layer 630a, the second circuit layer 630b, the shielding layer 640, and the blocking layer 650 of the touch module 600 in the present embodiment are similar to those in the embodiment illustrated in FIGS. 1-3 therefore will not be described herein. Through the disposition of the shielding layer 640, the first circuit layer 630a and the second circuit layer 630b could be disposed overlapping each other without causing any serious electrical interference. When the first circuit layer 630a and the second circuit layer 630b are disposed overlapping each other, as shown in FIG. 21 and FIG. 22, the total width of the first circuit layer 630a and the second circuit layer 630b is reduced, and accordingly the width of the non-sensing area 600b and the blocking layer 650 in the touch module 600 is reduced, which is advantageous to the narrow border design of the touch device and increases the size of the sensing area 600a.

The difference between the touch module 600 in the present embodiment and the touch module 100 illustrated in FIGS. 1-3 is that the touch module 600 has an On Cell design. In more detail, the touch module 600 further includes a display module. The display module includes a display panel 50. The display panel 50 includes a liquid crystal display (LCD) layer 50a, an upper glass 50b, and a lower glass 50c. The LCD layer 50a is disposed between the upper glass 50b and the lower glass 50c. The upper glass 50b is located between the lower glass 50c and the cover 610. The upper glass 50b has a surface 52, and the surface 52 faces the cover 610. The first sensing electrode layer 620a, the first circuit layer 630a, the second sensing electrode layer 620b, the second circuit layer 630b, and the shielding layer 640 are disposed on the surface 52 of the upper glass 50b. The touch module 600 further includes an optical adhesive layer 670. The optical adhesive layer 670 is applied to bond the upper glass 50b and the cover 610. Besides, the display module further includes an upper polarizer 50d and a lower polarizer 50e. The upper polarizer 50d is disposed between the upper glass 50b and the cover 610, and the lower polarizer 50e is disposed on the lower glass 50c.

Referring to FIG. 21 and FIG. 22, the touch module 600 in the present embodiment further includes an insulation layer 680a and an insulation layer 680b. The insulation layer 680a is disposed between the first circuit layer 630a and the shielding layer 640 to prevent the first circuit layer 630a and the shielding layer 640 from being electrically connected. The insulation layer 680b is disposed between the second circuit layer 630b and the shielding layer 640 to prevent the second circuit layer 630b and the shielding layer 640 from being electrically connected. The touch module 600 further includes a passivation layer 690. The passivation layer 690 covers the first sensing electrode layer 620a, the second sensing electrode layer 620b, the first circuit layer 630a, and the insulation layer 680a to prevent the first sensing electrode layer 620a, the second sensing electrode layer 620b, the first circuit layer 630a, and the insulation layer 680a from being exposed. The material of the insulation layer 680a, the insulation layer 680b, and the passivation layer 690 may be SiO2 or any other suitable insulative material, which is not limited in the present invention.

Figure 23:
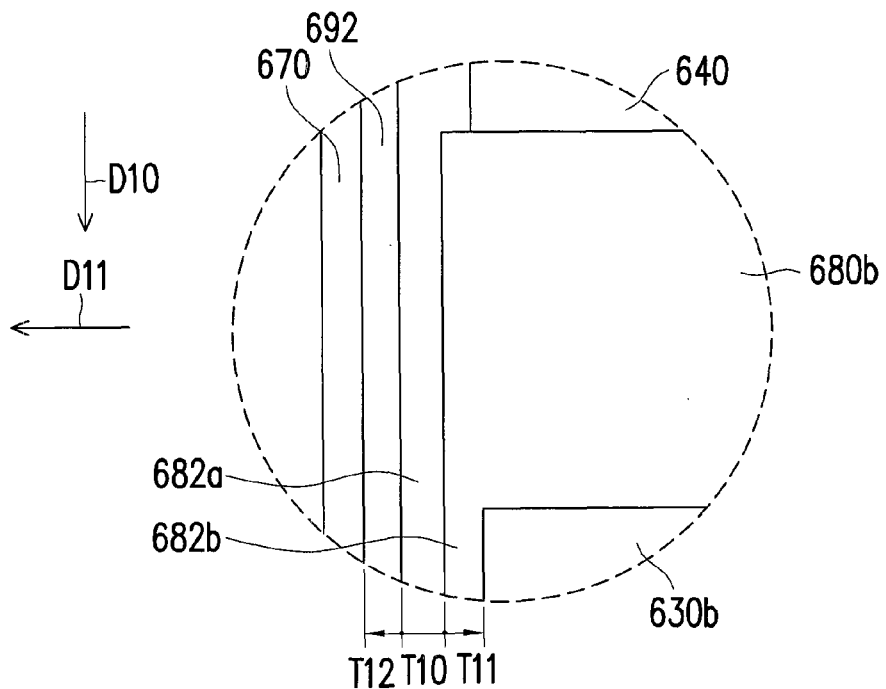
FIG. 23 is an enlarged view of the touch module in FIG. 21 in an area R5.

FIG. 23 is an enlarged view of the touch module in FIG. 21 in an area R5. Referring to FIG. 21 and FIG. 23, in more detail, an extension portion 682a of the insulation layer 680a is extended along a direction D10 perpendicular to the surface 612 of the cover 610 and encapsulates the shielding layer 640 and the insulation layer 680b. An extension portion 682b of the insulation layer 680b is extended along the direction D10 perpendicular to the surface 612 of the cover 610 and encapsulates the second circuit layer 630b. An extension portion 692 of the passivation layer 690 is extended along the direction D10 perpendicular to the surface 612 of the cover 610 and encapsulates the first circuit layer 630a, the insulation layer 680a, and the extension portion 682a of the insulation layer 680a. The minimum thickness T10 of the extension portion 682a of the insulation layer 680a along a direction D11 parallel to the surface 612 of the cover 610 may be greater than 0.3 mm, so that the insulation layer 680a offers a good insulation effect. The minimum thickness T11 of the extension portion 682b of the insulation layer 680b along the direction D11 parallel to surface 612 of the cover 610 may be greater than 0.3 mm, so that insulation layer 680b offers a good insulation effect. Besides, the minimum thickness T12 of the extension portion 692 of the passivation layer 690 along the direction D11 parallel to the surface 612 of the cover 610 may be greater than 0.3 mm, so that the passivation layer 690 offers a good passivation effect.

Figure 24:
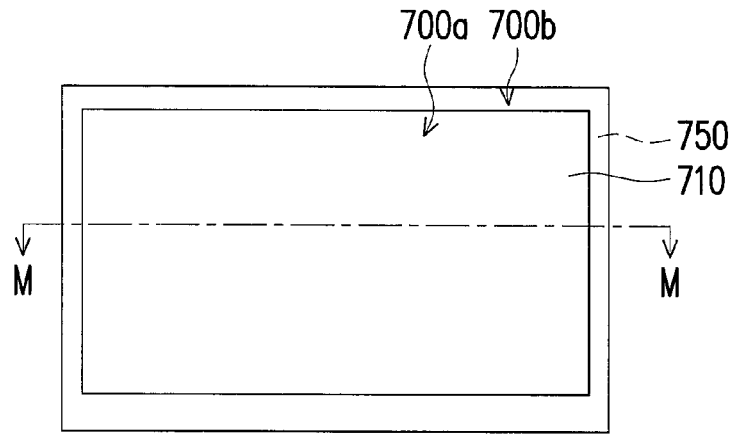
FIG. 24 is a diagram of a touch module according to another embodiment of the invention.
Figure 25:
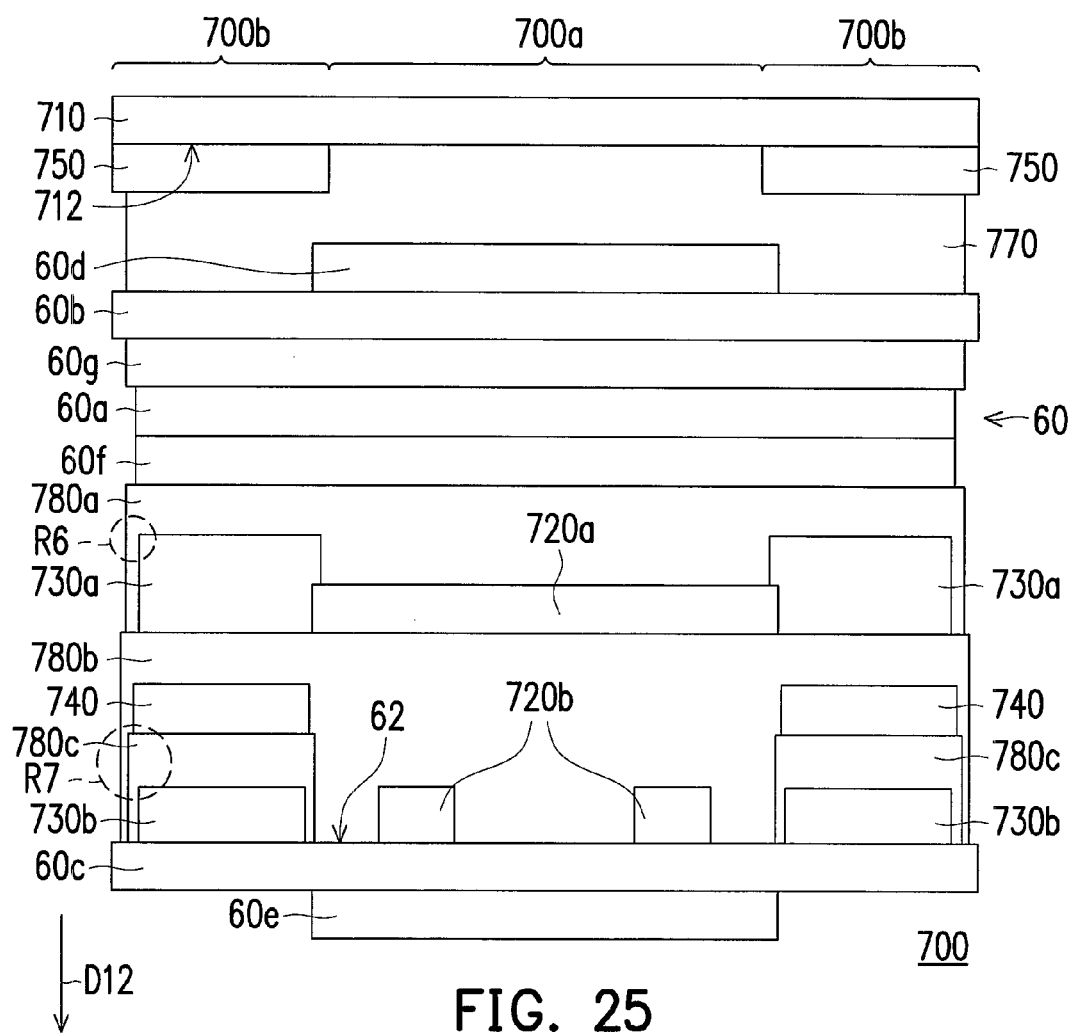
FIG. 25 is a cross-sectional view of the touch module in FIG. 24 along line M-M.

FIG. 24 is a diagram of a touch module according to another embodiment of the invention. FIG. 25 is a cross-sectional view of the touch module in FIG. 24 along line M-M. Referring to FIG. 24 and FIG. 25, the relative positions between the cover 710, the first circuit layer 730a, the second circuit layer 730b, the shielding layer 740, and the blocking layer 750 of the touch module 700 in the present embodiment are similar to those in the embodiment illustrated in FIGS. 1-3 therefore will not be described herein. Through the disposition of the shielding layer 740, the first circuit layer 730a and the second circuit layer 730b could be disposed overlapping each other without causing any serious electrical interference. When the first circuit layer 730a and the second circuit layer 730b are disposed overlapping each other, as shown in FIG. 25, the total width of the first circuit layer 730a and the second circuit layer 730b is reduced, and accordingly the width of the non-sensing area 700b and the blocking layer 750 in the touch module 700 is reduced, which is advantageous to the narrow border design of the touch device and increases the size of the sensing area 700a.

The difference between the touch module 700 in the present embodiment and the touch module 100 illustrated in FIGS. 1-3 is that the touch module 700 has an In Cell design. In more detail, the touch module 700 further includes a display module. The display module includes a display panel 60. The display panel 60 includes a LCD layer 60a, an upper glass 60b, and a lower glass 60c. The LCD layer 60a is disposed between the upper glass 60b and the lower glass 60c, and the upper glass 60b is located between the lower glass 60c and the cover 710. The lower glass 60c has a surface 62, and the surface 62 faces the upper glass 60b. The first sensing electrode layer 720a, the first circuit layer 730a, the second sensing electrode layer 720b, the second circuit layer 730b, and the shielding layer 740 are disposed on the surface 62 of the lower glass 60c. The touch module 700 further includes an optical adhesive layer 770. The optical adhesive layer 770 is applied to bond the upper glass 60b and the cover 710. In addition, the display module further includes an upper polarizer 60d, a lower polarizer 60e, a pixel electrode layer 60f, and a color filter 60g. The upper polarizer 60d is disposed between the upper glass 60b and the cover 710. The lower polarizer 60e is disposed on the lower glass 60c. The color filter 60g and the pixel electrode layer 60f are respectively disposed on two opposite surfaces of the LCD layer 60a.

Referring to FIG. 25, the touch module 700 in the present embodiment further includes an insulation layer 780a, an insulation layer 780b, and an insulation layer 780c. The insulation layer 780a is disposed between the first circuit layer 730a and the pixel electrode layer 60f to prevent the first circuit layer 730a and the pixel electrode layer 60f from being electrically connected. The insulation layer 780b is disposed between the first circuit layer 730a and shielding layer 740 between to prevent the first circuit layer 730a and the shielding layer 740 from being electrically connected. The insulation layer 780c is disposed between the second circuit layer 730b and the shielding layer 740 to prevent the second circuit layer 730b and the shielding layer 740 from being electrically connected. The material of the insulation layer 780a, the insulation layer 780b, and the insulation layer 780c may be SiO2 or any other suitable insulative material, which is not limited in the present invention.

Figure 26:
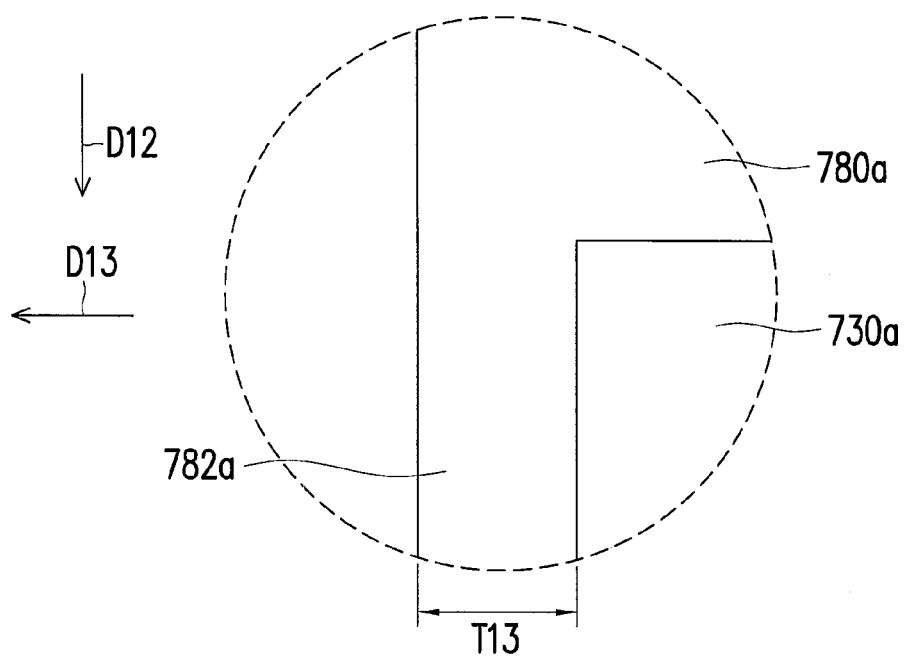
FIG. 26 is an enlarged view of the touch module in FIG. 25 in an area R6.

FIG. 26 is an enlarged view of the touch module in FIG. 25 in an area R6. Referring to FIG. 25 and FIG. 26, in more detail, an extension portion 782a of the insulation layer 780a is extended along a direction D12 perpendicular to the surface 712 of the cover 710 and encapsulates the first circuit layer 730a. The minimum thickness T13 of the extension portion 782a of the insulation layer 780a along a direction D13 parallel to the surface 712 of the cover 710 may be greater than 0.3 mm, so that the insulation layer 780a offers a good insulation effect.

Figure 27:
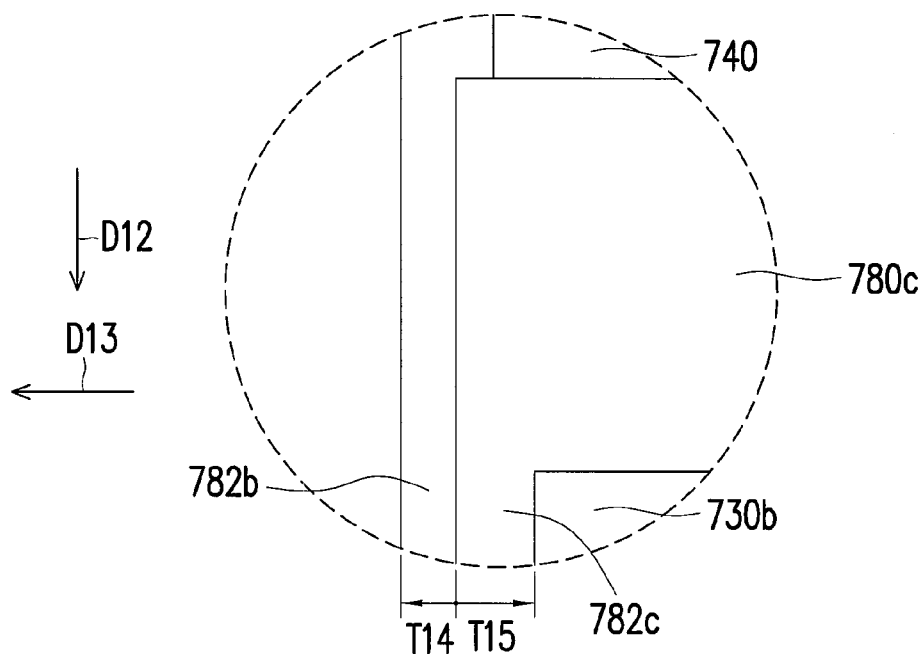
FIG. 27 is an enlarged view of the touch module in FIG. 25 in an area R7.

FIG. 27 is an enlarged view of the touch module in FIG. 25 in an area R7. Referring to FIG. 25 and FIG. 27, in more detail, an extension portion 782b of the insulation layer 780b is extended along the direction D12 perpendicular to the surface 712 of the cover 710 and encapsulates the shielding layer 740 and the insulation layer 780c. An extension portion 782c of the insulation layer 780c is extended along the direction D12 perpendicular to the surface 712 of the cover 710 and encapsulates the second circuit layer 730b. The minimum thickness T14 of the extension portion 782b of the insulation layer 780b along the direction D13 parallel to the surface 712 of the cover 710 may be greater than 0.3 mm, so that the insulation layer 780b offers a good insulation effect. The minimum thickness T15 of the extension portion 782c of the insulation layer 780c along the direction D13 parallel to the surface 712 of the cover 710 may be greater than 0.3 mm, so that the insulation layer 780c offers a good insulation effect.

As described above, an embodiment of the invention has at least one of following advantages. In an embodiment of the invention, a shielding layer is disposed between a first circuit layer and a second circuit layer in a non-sensing area of a touch module, such that the first circuit layer and the second circuit layer could be disposed overlapping each other without causing any serious electrical interference. When the first circuit layer and the second circuit layer are disposed overlapping each other, the total width of the first circuit layer and the second circuit layer is reduced, and accordingly, the width of the non-sensing area and a blocking layer in the touch module is reduced, which meets today's trend of narrow border design of touch devices.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch module, having a sensing area and a non-sensing area, wherein the non-sensing area surrounds the sensing area, the touch module comprising:
   a cover, covering the sensing area and the non-sensing area, and having a surface;
   a first sensing electrode layer and a second sensing electrode layer, disposed in the sensing area;
   a first circuit layer and a second circuit layer, disposed in the non-sensing area, and electrically connected to the first sensing electrode layer and the second sensing electrode layer respectively, wherein the first circuit layer and the second circuit layer at least partially overlap each other along a direction perpendicular to the surface of the cover;
   a shielding layer, disposed in the non-sensing area, and located between the first circuit layer and the second circuit layer at where the first circuit layer and the second circuit layer partially overlap each other along the direction perpendicular to the surface of the cover; and
   a blocking layer, disposed on the surface of the cover, and located in the non-sensing area, wherein the blocking layer at least partially overlaps the first circuit layer, the second circuit layer, and the shielding layer along the direction perpendicular to the surface of the cover, and the blocking layer does not exceed past one of the first circuit layer or the second circuit layer towards the sensing area.

2. The touch module as claimed in claim 1, wherein a material of the shielding layer includes silver paste or conductive graphite.

3. The touch module as claimed in claim 1, further comprising a first substrate and a second substrate, wherein the first sensing electrode layer, the first circuit layer, and the shielding layer are disposed on the first substrate, and the second sensing electrode layer and the second circuit layer are disposed on the second substrate.

4. The touch module as claimed in claim 1, further comprising a substrate, wherein the substrate has a first surface and a second surface opposite to each other, the first sensing electrode layer and the first circuit layer are disposed on the first surface of the substrate, and the second sensing electrode layer, the second circuit layer, and the shielding layer are disposed on the second surface of the substrate.

5. The touch module as claimed in claim 1, further comprising a substrate, wherein the substrate has a surface, and the first sensing electrode layer, the first circuit layer, the second sensing electrode layer, the second circuit layer, and the shielding layer are disposed on the surface of the substrate.

6. The touch module as claimed in claim 1, wherein the first sensing electrode layer, the first circuit layer, the second sensing electrode layer, the second circuit layer, and the shielding layer are disposed on the cover.

7. The touch module as claimed in claim 1, further comprising a substrate, wherein the first sensing electrode layer and the first circuit layer are disposed on the cover, the second sensing electrode layer and the second circuit layer are disposed on the substrate, and the shielding layer is disposed on the cover or the substrate.

8. The touch module as claimed in claim 1, further comprising a display module, wherein the display module comprises a display panel, the display panel comprises an upper glass and a lower glass, the upper glass is located between the lower glass and the cover, the upper glass has a surface, the surface faces the cover, and the first sensing electrode layer, the first circuit layer, the second sensing electrode layer, the second circuit layer, and the shielding layer are disposed on the surface of the upper glass.

9. The touch module as claimed in claim 1, further comprising a display module, wherein the display module comprises a display panel, the display panel comprises a upper glass and a lower glass, the upper glass is located between the lower glass and the cover, the lower glass has a surface, the surface faces the upper glass, and the first sensing electrode layer, the first circuit layer, the second sensing electrode layer, the second circuit layer, and the shielding layer are disposed on the surface of the lower glass.

10. The touch module as claimed in claim 1, further comprising at least one insulation layer, wherein the at least one insulation layer is disposed between the first circuit layer and the shielding layer or between the second circuit layer and the shielding layer.

11. The touch module as claimed in claim 10, wherein a number of the at least one insulation layer is two, one of the two insulation layers is disposed between the first circuit layer and the shielding layer, and another one of the two insulation layers is disposed between the second circuit layer and the shielding layer.

12. The touch module as claimed in claim 10, wherein an extension portion of the at least one insulation layer is extended along the direction perpendicular to the surface of the cover and encapsulates at least one of the first circuit layer, the second circuit layer, and the shielding layer, and a minimum thickness of the extension portion along a direction parallel to the surface of the cover is greater than 0.3 mm.

13. The touch module as claimed in claim 10, further comprising a passivation layer, wherein the passivation layer covers at least two of the first sensing electrode layer, the first circuit layer, the second sensing electrode layer, the second circuit layer, the shielding layer, and the insulation layer.

14. The touch module as claimed in claim 13, wherein an extension portion of the passivation layer is extended along the direction perpendicular to the surface of the cover and encapsulates at least two of the first circuit layer, the second circuit layer, the shielding layer, and the insulation layer, and a minimum thickness of the extension portion along a direction parallel to the surface of the cover is greater than 0.3 mm.

15. The touch module as claimed in claim 1, wherein the blocking layer and the non-sensing area completely overlap each other along the direction perpendicular to the surface of the cover.

* * * * *